(12) United States Patent
Brady

(10) Patent No.: US 7,891,101 B2
(45) Date of Patent: Feb. 22, 2011

(54) JAMB SAW

(76) Inventor: Michael L. Brady, 5006 Reed Dr., Oakwood, GA (US) 30566

( * ) Notice: Subject to any disclaimer, the term of this patent is extended or adjusted under 35 U.S.C. 154(b) by 505 days.

(21) Appl. No.: 11/957,976

(22) Filed: Dec. 17, 2007

(65) Prior Publication Data

US 2009/0151530 A1    Jun. 18, 2009

(51) Int. Cl.
*B27B 5/08*    (2006.01)
*B27B 5/00*    (2006.01)

(52) U.S. Cl. ............................. 30/371; 30/373; 30/388; 30/500; 144/136.1; 144/136.95

(58) Field of Classification Search .................. 30/390, 30/391, 393, 375, 376, 377, 122, 500, 292, 30/293, 347, 276, 370, 371, 388; 408/20; 144/35.1, 136.95, 154.5, 136.1; 7/148, 158, 7/165; 29/560–560.1; 451/461, 358; 81/438; 409/180, 182; 83/825
See application file for complete search history.

(56) References Cited

U.S. PATENT DOCUMENTS

| | | | |
|---|---|---|---|
| 2,610,658 A * | 9/1952 | Koeling ........................ 30/373 |
| 2,741,282 A * | 4/1956 | Wieting .................... 144/136.1 |
| 2,952,281 A * | 9/1960 | Weber ...................... 144/136.1 |
| 4,876,793 A | 10/1989 | Quaglia ........................ 30/122 |
| 5,784,789 A * | 7/1998 | Vargas .......................... 30/388 |
| 5,815,932 A * | 10/1998 | Presher et al. ................ 30/373 |
| 5,967,013 A | 10/1999 | McKenzie et al. ............ 83/483 |
| 6,048,260 A * | 4/2000 | Kopras ........................ 451/358 |
| 6,318,352 B1 | 11/2001 | Gnazzo et al. ................ 125/12 |
| 6,449,852 B1 | 9/2002 | Simantel ...................... 30/373 |
| 6,574,867 B1 * | 6/2003 | Bradshaw ..................... 30/122 |
| 6,588,111 B2 | 7/2003 | Williams ...................... 30/391 |
| 6,678,960 B2 * | 1/2004 | Williams ...................... 30/391 |
| 7,077,736 B2 * | 7/2006 | Uzumcu et al. ............. 451/359 |
| 7,596,872 B2 * | 10/2009 | Clarke et al. .................. 30/391 |
| 2002/0166244 A1 * | 11/2002 | Williams ...................... 30/388 |
| 2005/0155233 A1 * | 7/2005 | Chen ........................... 30/388 |
| 2008/0264225 A1 * | 10/2008 | Crain et al. ................... 83/478 |

* cited by examiner

*Primary Examiner*—Laura M. Lee
(74) *Attorney, Agent, or Firm*—Nexsen Pruet, LLC; Joseph T. Guy

(57) ABSTRACT

A powered jamb saw is provided which is ideally suited for making corner cuts. A cylindrical housing for the shaft of the circular saw blade is mounted in a split bushing tensioned by a threaded bolt secured to and for rotation by a handle positioned so as to permit the workman to use both hands to position the jamb saw during its use in making cuts.

7 Claims, 5 Drawing Sheets

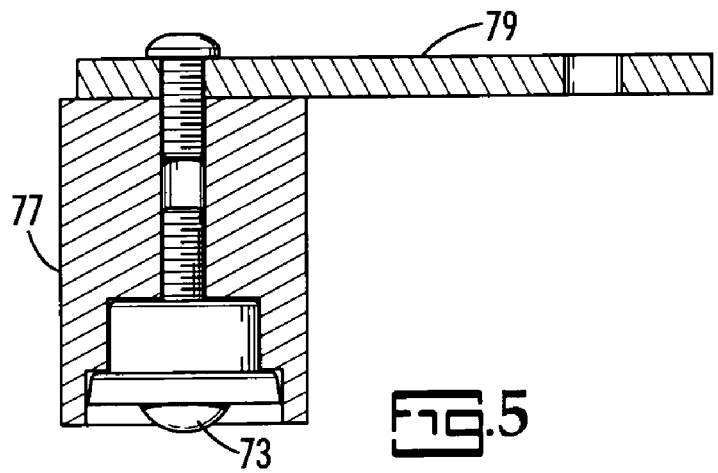
FIG.5
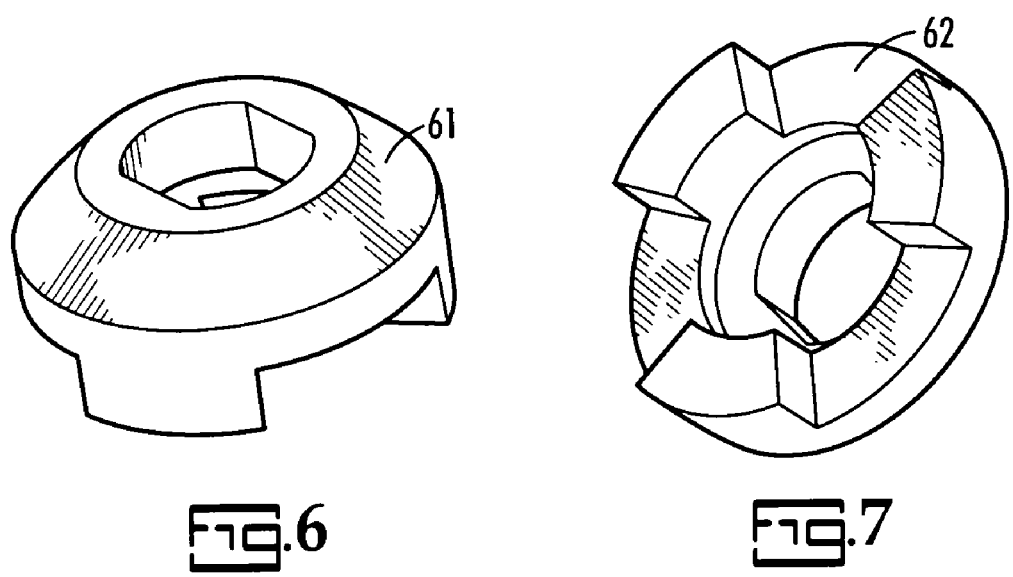
FIG.6
FIG.7
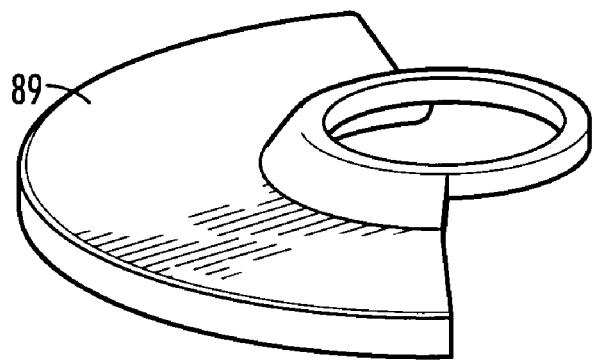
FIG.8

JAMB SAW

BACKGROUND OF THE INVENTION

The invention relates to a powered hand tool for trimming door jambs and casings. Door jambs and casings are often installed before the flooring is laid and for that reason the door joints and casings must be trimmed to a predetermined distance above the sub-floor in order to install the flooring which extends beneath the door jambs and casings. U.S. Pat. Nos. 5,967,013 and 6,449,852 describe jamb saws described as useful for door jamb and casing trimming including trimming in corners. The jamb saws shown in the before mentioned patents and door jamb saws currently marketed are deficient in adaptability for connection to a power unit, are awkward to hold and operate and are not convenient to adjust the height of cut.

SUMMARY OF THE INVENTION

The invention is a hand held power tool for trimming door jambs and casing and particularly a jamb saw attachable to a power tool having a rotary output shaft. The jamb saw includes a circle saw blade secured to a shaft rotatably mounted in a cylindrical shaft support column which in turn is supported in a vertically split bushing portion of a blade housing in a vertically adjustable manner and the blade housing is supported on three floor engageable rollers. The shaft support column and the bushing portion have cooperating guide components permitting relative vertical movement and preventing relative rotary movement. After adjusting the height of the saw blade, by vertically adjusting the saw blade support column relative to the blade housing, the split bushing portion is contracted by rotating a threaded bolt interconnecting circumferentially confronting segments of the split bushing portion. Rotation of the bolt is effected by a hand held tensioning handle rigidly secured to the unthreaded end of the bolt. In using the jamb saw, one hand grips the power tool and the other hand grips the tensioning handle thereby facilitating efficient positioning and accurate operation of the jamb saw. A pair of roller arms have first ends pivotally mounted to the housing on vertical axes and second ends each supporting a floor engageable roller. The roller arms are biased to diametrically opposite positions relative to the saw drive shaft and are retractable against the bias during use of the jamb saw in making corner cuts. Releasable coupling components are provided on the upper end of saw shaft and the power tool output shaft.

BRIEF DESCRIPTION OF THE DRAWINGS

The invention is illustrated in the accompanying drawings in which:

FIG. 5 is a vertical section of a roller and its support arm;

FIG. 6 and 7 are perspectives of a shaft coupler;

FIG. 8 is a perspective of a saw guard;

DETAILED DESCRIPTION OF THE INVENTION

Figure 1:
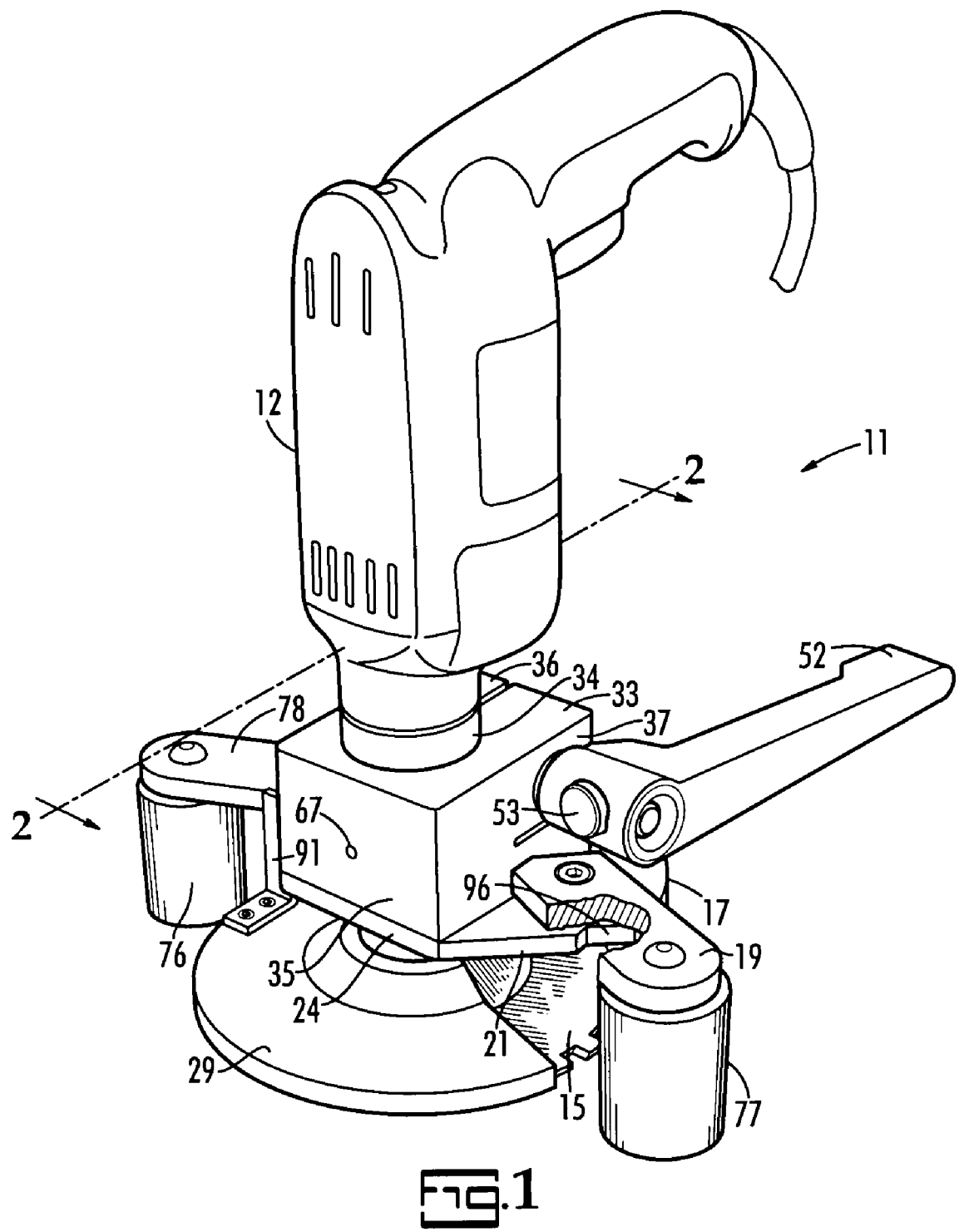
FIG. 1 shows the jamb saw powered by an electric powered screw gun.

FIG. 1 shows the jamb saw 11 of this invention powered by a modified screw gun 12. Referring also to FIGS. 2, 3, 4, 9 and 10, the jamb saw 11 has a support structure 13 including a housing 14 partially sheltering a circular saw blade 15. The housing 14 includes a horizontal roof 16 having a 150 degree arc shaped edge 17 concentric with the axis 18 of the saw blade 15 and straight edges 21, 22 at a right angle to one another extending in a converging manner from the ends of the arc shaped edge 17. The roof 16 terminates in a forward edge 24 disposed at 45 degrees to the straight edges 21, 22 which terminate at equal distances from their theoretical point of convergence.

The housing 14 includes a block shaped bushing 31 having a lower part 32 which is rigidly secured by fasteners in the form of screws 26 to the roof 16 and includes a cylindrical vertical bore 35 concentric with a cylindrical vertical bore 35' in the roof 16. The bores are concentric with the axis 18 of the saw 15. A vertical front face 25 of the bushing 31 is aligned with the forward edge 24 of the roof 16. The bushing 31 includes an upper split bushing part 33 partially separated from the lower part 32 by a horizontal gap resulting from a horizontal cut extending across slightly more than half the horizontal width of the annular bore 41 formed in the bushing 31. A vertically adjustable cylindrical shaft housing 34 is mounted in the annular bore 41. The split bushing part 33 includes a pair of circumferentially spaced confronting segments 36, 37 which, when drawn toward one another by an adjustable tension mechanism, prevent axial and rotatational movement of the shaft housing 34.

Figure 2:
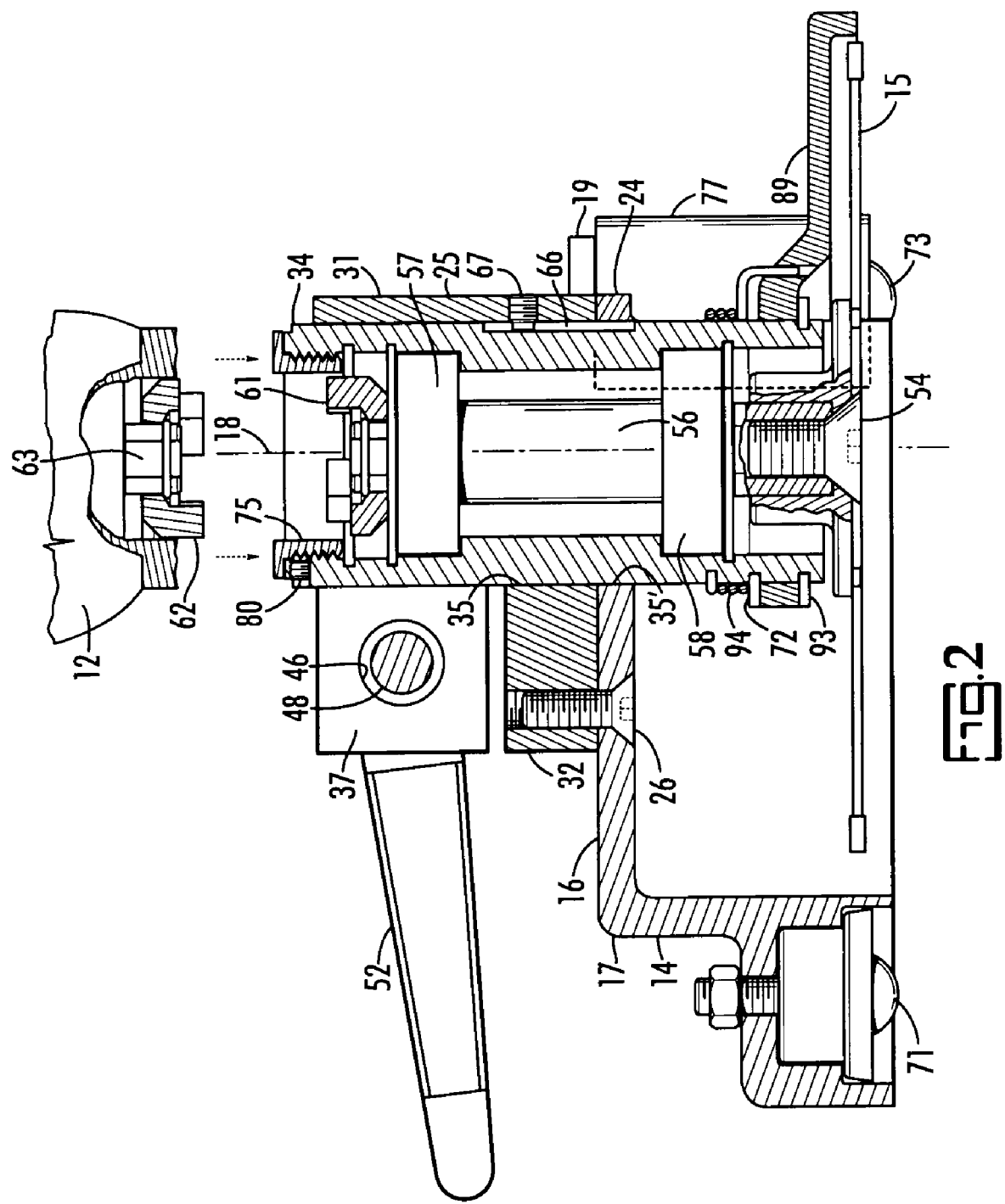
FIG. 2 is a section taken on line 2-2 in FIG. 1.
Figure 3:
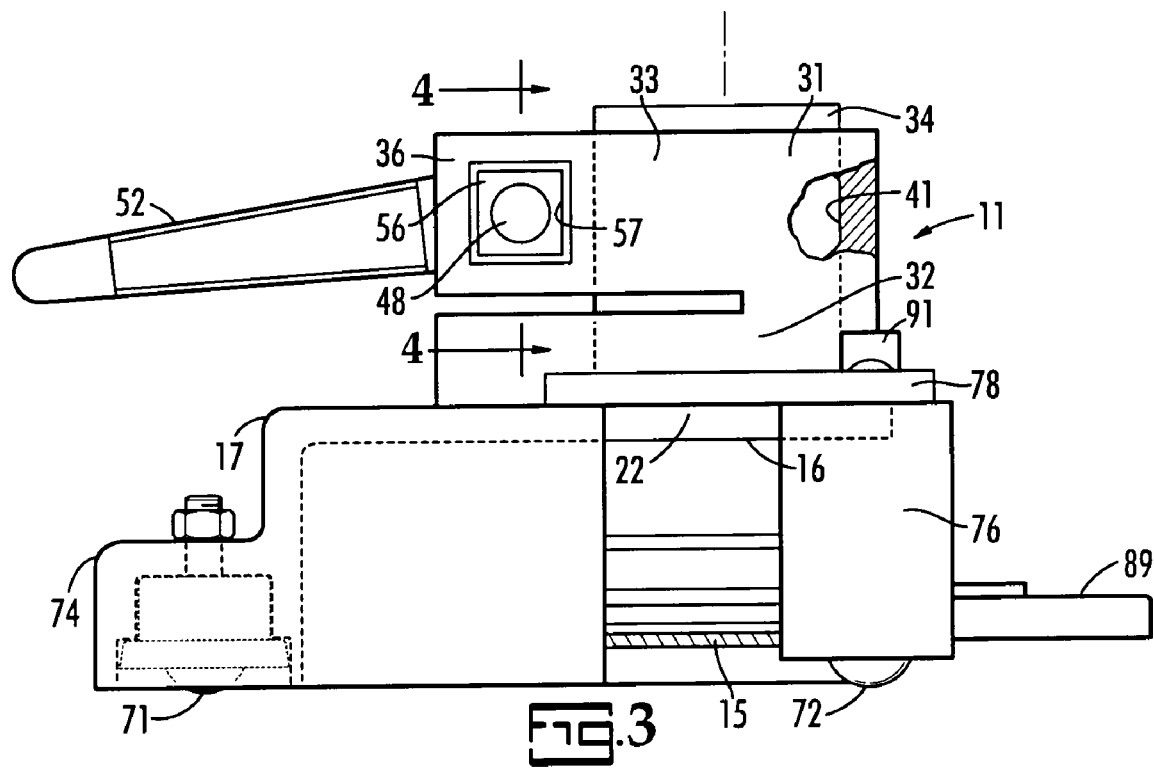
FIG. 3 is a side view of the jamb saw.
Figure 4:
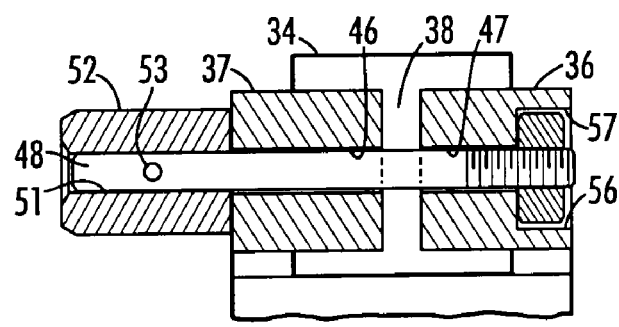
FIG. 4 is a section taken on line 4-4 in FIG. 3.
Figure 9:
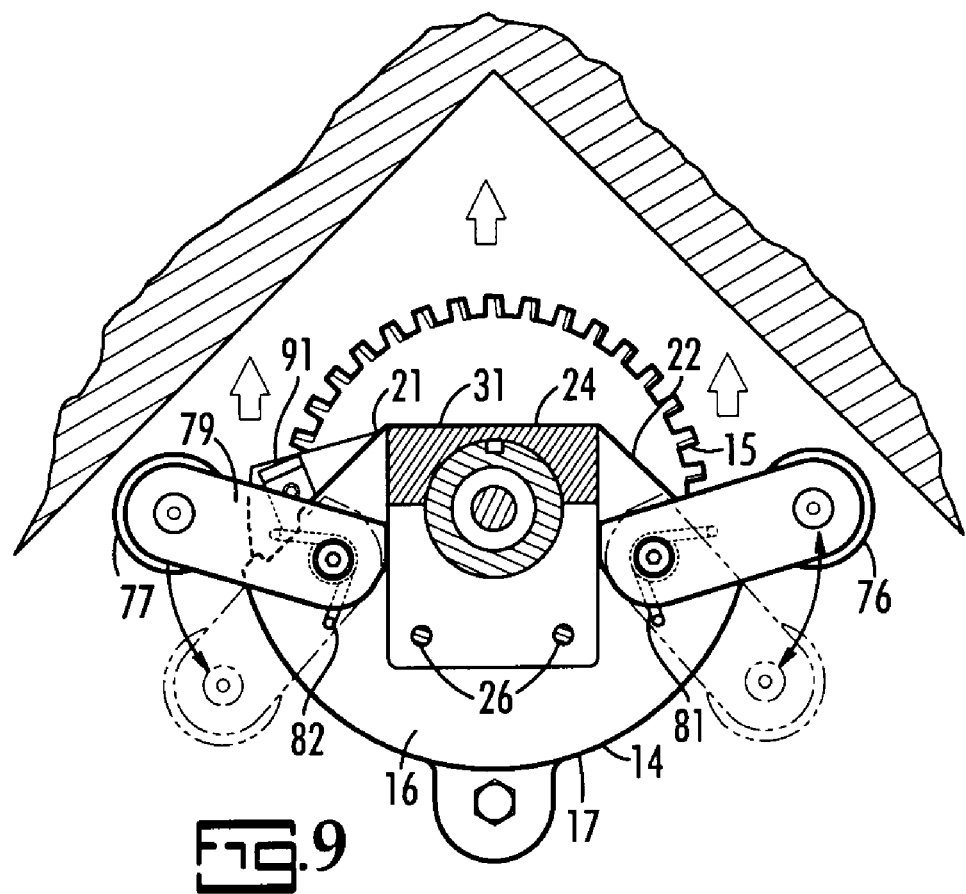
FIG. 9 is a top view of the jamb saw approaching a corner with parts broken away for illustration purposes.

As shown in FIGS. 3 and 4, the split bushing segments 36, 37 include aligned horizontal bores 46, 47 and the adjustable tension mechanism includes a tension bolt 48 extending through the bores 46, 46 and through a bore 51 in a handle 52. A pine 53 secures the handle 52 to the tension bolt 48. The tension bolt 48 includes a threaded end in threaded engagement with a square nut 56 nonrotatably nested in a quadrilateral recess 57 in the bushing segment 36. When the handle 52 is rotated counter clockwise to a horizontal position, as viewed in FIGS. 2 and 3, the bushing segments 36, 37 are drawn toward one another thereby securing the bushing 31 to the cylindrical shaft housing 34. In its horizontal position, the handle 52 can be griped by the workers left hand during a cutting operation with the jamb saw 11. Rotating the lever clockwise, as viewed in FIGS. 2 and 3, loosens the bushing 31 from the cylindrical shaft housing 34, permitting the housing 34 and the saw blade 15 to be raised or lowered relative to the shaft housing 14, thus adjusting the height of the cut made by the blade 15. As shown in FIG. 2, the saw blade 15 is releasably secured by a screw 54 to a vertical shaft 56 mounted in the shaft housing 34 by a pair of vertically spaced anti-friction bearings 57, 58. A coupler 61 is nonrotatably secured to the upper end of the shaft 56 and the coupler 61 is meshable with a similar coupler 62 secured to the output shaft 63 of the screw gun 12. During an adjustment of the height of the saw cut, a guide mechanism including a vertical grove 66 in exterior of the shaft housing 34 and a registering set screw 67 in the bushing 31 prevent relative rotation of the shaft housing 34 and the bushing 31.

Figure 10:
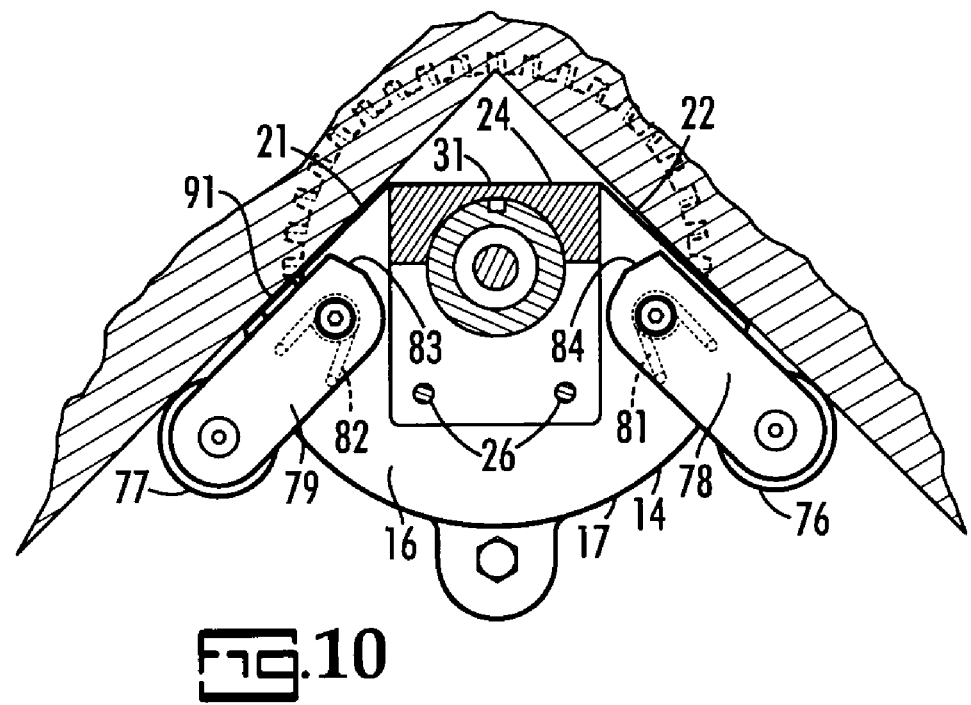
FIG. 10 is a top view similar to FIG. 9 showing the jamb saw engaged in a corner cut.

The jamb saw 11 is supported on three spherical rollers 71, 72, 73. Roller 71 is mounted in a central rear position on a rearward projection 74 of the housing 14. Rollers 72, 73 are mounted in vertically oriented cylindrical housings 76, 77, respectively, which in turn are secured to horizontally extending arms 78, 79 pivotally connected on vertical axes to laterally opposite portions of the roof 16 of the housing 14. Roller 73, housing 77 and arm 79 are shown in vertical section in FIG. 5. The arms 78, 79 are biased by springs 81, 82 to their arm extended positions shown in FIG. 9 in which arm abutments 83, 84 contact opposite vertical sides of the quadrilateral shaped bushing 31. As shown in FIG. 10, the straight edges 21, 22 of the housing 14 limit the depth of the corner cut by the jamb saw. The edges 21, 22 are also useful in limiting the depth of cut in side wall casings.

FIGS. 6 and 7 show the construction of the three prong driving couplers 61, 62. As shown in FIG. 2, an externally threaded cylindrical insert 75 is in threaded engagement with internal threads in the upper end of the shaft housing 34 and a set screw 80 retains the insert 75. The insert 75 aligns the couplers 61, 62. A swing guard 89 for the saw blade 15 is shown in FIGS. 1, 2, 3 and 8. As shown in FIG. 2 the swing guard 89 is rotatably secured to the cylindrical shaft housing 34 by snap rings 92, 93 and the swing guard 89 is biased to its blade guarding position shown in FIG. 1 by a coil spring 94 encircling the shaft housing 34 with ends inserted in appropriate openings in the shaft housing 34 and the swing guard 89.

The illustrated and hereinbefore described jamb saw 11 is an efficient, easy to use tool for trimming casings and door jambs. The 90 degree edges 21, 22 serve to guide and limit the depth of the cut. The height of the cut can be quickly changed by rotating the handle 52, adjusting the vertical position of the shaft housing 34 and then rotating the handle 52 to tighten the split bushing 31 on the shaft housing 34. In making a cut with the jamb saw, the workman has his right hand on the screw gun 12 and his left hand on the lever 52. He holds the swing guard 89 in its retraced position shown in FIGS. 9 and 10 by engaging an upstanding lever 91 on the swing guard 89 with the index finger of his left hand. Using both hands in operating the jamb saw contributes to safe efficient use of the jamb saw. In the full corner cut position shown in FIG. 10, the swing guard lever 91 nests within a recess 96 in the roof 16 of the housing 14 and is flush with the edge 21 of the roof 16. The recess is clearly shown in FIG. 1.

What is claimed is:

1. A jamb saw comprising:
   a saw blade housing including a horizontal roof and a cylindrically shaped side wall structure defining an open bottom, an open front, a closed rear side and partially open laterally opposite sides, said roof having a vertical annular opening,
   an upstanding bushing having
      a vertical bore aligned with said vertical annular opening and
      a vertically extending circumferential gap between circumferentially confronting segments, said bushing having a bottom portion not forming parts of said confronting segments, said bottom portion being rigidly secured to said roof,
   a vertically adjustable cylindrical shaft housing concentrically positioned in said vertical bore of said bushing,
   a vertical shaft rotatably mounted coaxially in said cylindrical shaft housing having an upper end adapted for a driving connection to an output shaft of a reversibly attachable hand held power tool and a lower end extending downward into said cylindrical shaft housing,
   a circular saw blade secured coaxially to said lower end of said shaft,
   a support roller on said rear side of said saw blade housing,
   a pair of roller support arms having corresponding inward ends pivotally connected on vertical axes at laterally opposite portions of said blade housing and having corresponding outward ends,
   a support roller mounted on each of said corresponding outward ends of said roller support arm, a biasing spring interposed between each of said arms and said saw blade housing urging said arms to extend radially outward in relation to said vertical axes, and
   a threaded tension device connected to said confronting segments of said bushing including a tensioning handle pivotable about a horizontal axis and disposed for gripping by a hand of a person using said jamb saw, said tension device being operable by said lever to control relative vertical movement between said bushing and said cylindrical shaft housing.

2. The jamb said of claim 1 wherein said roof includes edges at said open front disposed at a 90 degree angle to one another facilitating corner cuts with said jamb saw.

3. A jamb saw comprising:
   a saw blade housing portion having
      a horizontally extending roof including
         an annular vertical opening having a first vertical axis,
         a pair of straight edges spaced equal distances from said annular vertical opening and disposed at a right angle to one another, said straight edges having diverging ends and converging ends, said converging ends terminating at equal distances from the theoretical point of convergence of said straight edges,
         a straight front edge interconnecting said converging ends of said straight edges and
         an annular edge concentric with said annular vertical opening interconnecting said diverging ends of said straight edges,
      a cylindrically shaped side wall rigidly secured to said annular edge of said roof and extending downwardly from said roof in a semi-circle configuration, said roof and said cylindrically shaped side wall forming a cavity for a circular saw blade, said cavity having a vertically open bottom and a horizontally open front between circumferentially opposite ends of said cylindrically shaped side wall and
      a first roller ball mounted in supporting relation to a circumferentially central portion of said cylindrically shaped side wall,
   a vertically split collar rigidly secured to the top of said roof including
      a cylindrically shaped vertical opening aligned with said annular vertical opening in said roof and
      a pair of circumferentially spaced confronting segments,
   a vertically adjustable cylindrical shaft housing mounted in said vertical openings of said split collar and said roof,
   a tensioning mechanism interposed between said confronting segments of said split collar operable to selectively contract said collar including a pivotable operating handle pivotable about a horizontal axis,
   a pair of roller support arms having
      first corresponding ends pivotally supported on said saw blade housing on second and third vertical axes spaced equal distances from said first vertical axis, and
      second corresponding ends,
   a support roller on each of said second corresponding ends of said support arms, said support rollers supporting said saw blade housing,
   a biasing spring interposed between each of said arms and said saw blade housing urging said arms to extend radially outward in relation to said first vertical axis, a circular saw blade, a vertical shaft having upper and lower ends, said lower end being secured to said circular saw blade, vertically spaced antifriction bearings interposed between said shaft and said shaft housing and a coupling component rigidly secured to the upper end of said shaft adapted for reversible connection to a mating coupling on the output shaft of an attachable hand supported power unit.

4. The jamb saw of claim 3 including mating guide parts on said collar and cylindrical shaft housing permitting relative axial movement and preventing relative rotational movement between said collar and said cylindrical shaft housing.

5. The jamb saw of claim 4 wherein said mating parts are a vertical groove in said cylindrical shaft housing and a set screw in a threaded radially extending opening in said vertically split collar, said set screw also serving to releasably restrain said shaft housing against axial movement relative to said collar.

6. The jamb saw of claim 3 wherein said support arms are pivotable from a forward position in which the associated support rollers are substantially coplanar with said first vertical axis to a rearward position in which they are within said right angle defined by said pair of straight edges of said roof.

7. The jamb said of claim 3 including a swing guard for said saw blade pivotally mounted on said cylindrical shaft housing including an annular edge, an upstanding lever near said annular edge extending above said roof of said saw blade housing and a notch in said roof receiving said lever when said swing guard is pivoted from a saw blade guarding position to a saw blade exposed position.

* * * * *